US007720757B2

(12) United States Patent
Srinivasan et al.

(10) Patent No.: US 7,720,757 B2
(45) Date of Patent: May 18, 2010

(54) SYSTEM AND METHOD FOR PROVIDING A CREDIT ACCOUNT FOR DEBT RECOVERY

(75) Inventors: Krishnakumar Srinivasan, Valmiki Nagar (IN); Brian F. Stone, Norcross, GA (US); Mark R. Pendleton, Atlanta, GA (US)

(73) Assignee: Compucredit Intellectual Property Holdings Corp. II, LAs Vegas, NV (US)

( * ) Notice: Subject to any disclaimer, the term of this patent is extended or adjusted under 35 U.S.C. 154(b) by 1623 days.

(21) Appl. No.: 10/706,470

(22) Filed: Nov. 12, 2003

(65) Prior Publication Data

US 2005/0102228 A1 May 12, 2005

(51) Int. Cl.
*G06F 17/60* (2006.01)
(52) U.S. Cl. ......................................................... 705/39
(58) Field of Classification Search ..................... 705/39
See application file for complete search history.

(56) References Cited

U.S. PATENT DOCUMENTS

| 5,950,179 | A | * | 9/1999 | Buchanan et al. | 705/38 |
|---|---|---|---|---|---|
| 5,966,698 | A | * | 10/1999 | Pollin | 705/34 |
| 2002/0123962 | A1 | * | 9/2002 | Bryman et al. | 705/39 |
| 2002/0138409 | A1 | * | 9/2002 | Bass | 705/38 |
| 2003/0074290 | A1 | * | 4/2003 | Clore | 705/35 |
| 2004/0019560 | A1 | * | 1/2004 | Evans et al. | 705/40 |

OTHER PUBLICATIONS

CuraDebt Website (via Wayback Machine) http://web.archive.org/web/20020120223547/http://www.curadebt.com/; http://web.archive.org/web/20020530235900/http://www.curadebt.com/; http://web.archive.org/web/20020204195550/http://www.curadebt.com/settlements/default.asp.*
CuraDebt Website (via Wayback Machine) http://web.archive.org/web/20020608002505/http://www.curadebt.com/settlements/default.asp http://web.archive.org/web/20020802232934/http://www.curadebt.com/settlement/debt-settlement.*
The Credit Card Handbook by Robert Chamness, published by American Bankers Association Washington DC; Copyright 1989.*
Consumer Financial Services Law Report Mar. 5, 2000, vol. 3, No. 18, 658 words: copyright 2000 LRP Publications.*
"Sears Tests Starter Card," Newsletter, News brief, Jan. 28, 1997, 1 page.*

* cited by examiner

*Primary Examiner*—James P Trammell
*Assistant Examiner*—Mary Gregg
(74) *Attorney, Agent, or Firm*—Sentry Law Group

(57) ABSTRACT

The invention includes systems and methods for providing a credit account for debt recovery. A recovery credit account is provided for a customer with an existing charged-off debt. Some of the customer's charged-off debt may be forgiven as part of a settlement when the customer enrolls in the recovery credit account, but the opening balance of the recovery credit account will represent the entire debt obligation of the customer going forward. The recovery credit account includes a credit limit that is lower than the opening balance. Reducing the account balance to less than the credit limit triggers open-to-buy status, issuance of a credit card, and activation of over the limit fees for future balances over the credit limit.

24 Claims, 5 Drawing Sheets

200

```
┌─────────────────┐
│ $1000 Charged-  │
│    Off Debt     │
│      210        │
└─────────────────┘
         │
         ▼
```

Customer Enrolls  220

Account Balance: $500
Credit Limit: $400
Open-to-Buy: No
OTB Payment: $150
130

→ $500 Settlement  224

$50 Payment  230

Account Balance: $450
Credit Limit: $400
Open-to-Buy: No
OTB Payment: $100
130

$100 Payment  240

Account Balance: $350
Credit Limit: $400
Open-to-Buy: Yes
OTB Payment: $min
130

→ Credit Card Issued  242

$100 Charge  250

Account Balance: $450
Credit Limit: $400
Open-to-Buy: No
OTB Payment: $100
130

→ Over-limit Charges Apply  252

Figure 2

SYSTEM AND METHOD FOR PROVIDING A CREDIT ACCOUNT FOR DEBT RECOVERY

BACKGROUND OF THE INVENTION

1. Field of the Invention

The present invention relates to the field of credit account products and, more specifically, credit account products that provide for the recovery of charged-off debt.

2. Description of Related Art

Non-paying customers are a reality that credit-issuing businesses cannot totally avoid. When a customer stops paying on a credit account with a positive balance, the creditor must decide how to handle the outstanding debt and attempt to recover at least some of the loss that the account balance represents. Initially, a variety of notices are usually used to encourage the customer to begin paying on the account again. However, after a substantial period of non-payment, most credit-issuers will classify the account as charged-off—representing that they have recognized the unlikelihood of collecting on the full debt obligation.

There are a variety of ways to deal with charged-off accounts. Some common approaches include internal or external departments that negotiate settlement or refinancing for the repayment of some or all of the debt, usually on different terms than those originally associated with the account. Another approach is the use of outside collection agencies that purchase the debt at some reduced rate or charge a commission for recovered monies. Unfortunately, many common tactics have limited success rates and frequently damage the customer relationship.

One approach to the recovery of charged-off debts that has the benefit of both increased collections and maintaining the customer relationship is the use of debt recovery credit accounts, such as reaffirmation credit cards. Essentially, debt recovery credit accounts extend a new credit account to the customer conditioned on repayment of some, or all, of the charged-off debt obligation. In the case of reaffirmation credit cards, the customer is reaffirming their debt obligation to the credit issuer in return for a new line of credit.

Prior methods of administering reaffirmation credit cards involve a two record model. The first record is the credit account itself, with an associated balance, credit limit, interest rate, and other features. The second record is a pre-existing debt record. The pre-existing debt record is a holding account that is reduced by customer payments and may or may not have an interest rate or other features. As payments to the reaffirmation credit card are received, they are split between the two accounts according to some formula (50/50, 25/75, or more complicated fixed or percentage formulas that give payment preferences for new charges or pre-existing debt). Interest rates, service charges, minimum payment formulas, and other aspects are usually different for the two records. For example, the credit account may be administered like any standard credit account, while the pre-existing debt record is an interest free account as long as regular payments continue to be made.

In one version of a reaffirmation credit card, the charged-off debt is actually split between the credit account and the pre-existing debt record. For example, if the charged-off debt was $1000, the opening balance of the credit account would be $500 and the opening balance of the pre-existing debt record would be $500. The credit limit for the credit account would be set to the starting balance ($500), making the available balance $0.

In an alternate version of the reaffirmation credit card, the entire charged-off debt is placed in the pre-exiting debt record—for example, providing an opening credit account balance of $0 and an opening pre-existing debt balance of $1000. The credit limit of the credit account is then set to a low value, such as $50, to provide an initial available credit of $50. Increases of the low starting credit limit can then be based upon establishment of a regular payment history or other criteria moving forward.

Either configuration of the reaffirmation credit card requires the administration of two account records. This increases administrative overhead, complicates formulas and transactions, and makes the account more difficult for the customer to understand and effectively administer. In addition, both configurations provide a credit card to the customer at enrollment and make credit available immediately or after the first payment, no matter how small.

Accordingly, there is a need for a debt recovery credit account that is easier to administer and use than the two record approach of prior reaffirmation credit cards. Improved incentives for payment and limits on the credit-issuer's initial exposure to non-payment or new credit liabilities would also be advantageous.

SUMMARY OF THE INVENTION

The invention includes systems and methods for providing a credit account for debt recovery. A recovery credit account is provided for a customer with an existing charged-off debt. Some of the customer's charged-off debt may be forgiven as part of a settlement when the customer enrolls in the recovery credit account, but the opening balance of the recovery credit account will represent the entire debt obligation of the customer going forward (assuming any contingencies in the settlement are met).

In some embodiments of the invention, the recovery credit account includes a credit limit that is lower than the opening balance. The recovery credit account is not open-to-buy until the recovery credit account balance is paid down to a level less than the credit limit. In addition, a credit card corresponding to the recovery credit account is not issued to the customer until the recovery credit account is open-to-buy. Bills issued to the customer include an indication of the payment amount required to reduce the recovery credit account balance to less than the credit limit and achieve open-to-buy status. Bills also include a suggested payment for achieving open-to-buy status within a predetermined period from the opening of the account. If the recovery credit account includes an over the limit fee, the fee will not be assessed until the account balance has previously been reduced below the credit limit and achieved open-to-buy status at least once (and conditions for the over the limit fee are otherwise met). Other credit card features, such as minimum payments, automatic payments, etc., are compatible with most embodiments of the invention.

BRIEF DESCRIPTION OF THE DRAWINGS

FIG. 2 is a diagram of example transactions illustrating the enrollment, management, and use of a credit account with debt recovery features.

DETAILED DESCRIPTION

Figure 1:
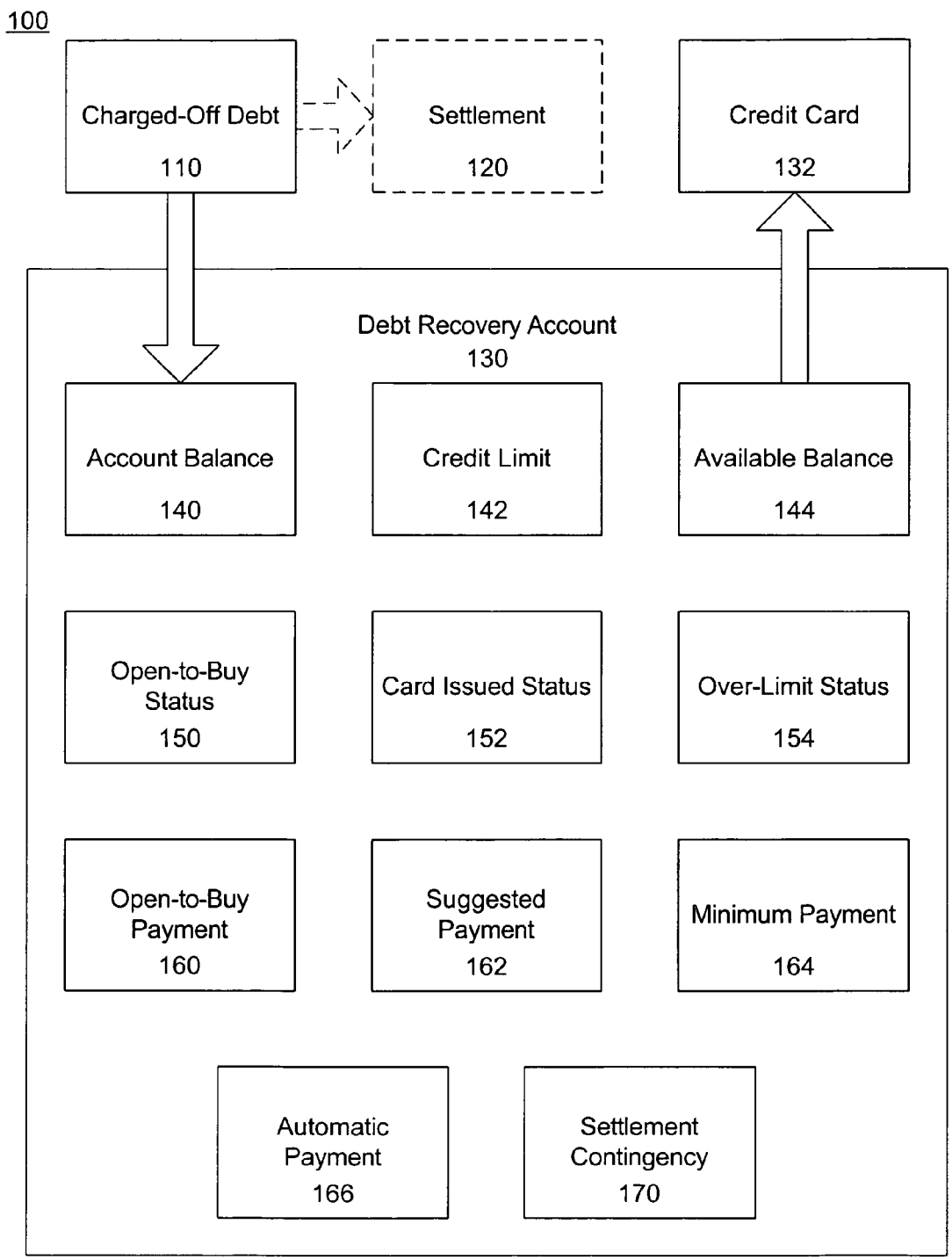
FIG. 1 is a block diagram of an example credit account with debt recovery features.

FIG. 1 shows a credit account product 100 for providing debt recovery. A credit issuer that has or acquires a charged-off debt 110 offers the credit account product 100 as a means of realizing at least some portion of the charged-off debt 110. The credit account product 100 is offered to the customer with the charged-off debt 110. The offer may be made as part of a settlement negotiation intended to get the customer to reaffirm at least some portion of the debt. The portion that is not reaffirmed is written-off as a settlement 120. The settlement 120 may be an upfront settlement, may be based upon specified settlement contingencies (such as making future payments), or may be a combination of upfront and contingent settlement. The process of settlement and the possibility of reducing the debt is an incentive for reaffirmation by the customer. Note that the charged-off debt 110 need not represent a single unpaid credit account to a single credit issuer or account holder. For example, the charged-off debt 110 may include debt consolidation from multiple accounts or debt holders that have been aggregated for collection, settlement, or reaffirmation purposes.

The portion of the charged-off debt 110 that is not settled is moved into a new debt recovery account 130. The debt recovery account 130 is a credit account administered by the credit issuing business. In one embodiment, the debt recovery account 130 is a credit card account and is generally administered in accordance with known practices for administering credit card accounts, with the additional features noted below. A credit card 132 is associated with the debt recovery account 130 and issued to the customer to enable access to the debt recovery account 130. While the example embodiment is a credit card account and associated magnetic strip card or smart card token, other forms of credit account may also embody the invention. For example, some credit accounts may be entirely electronic and use a PIN, encryption key, or similar token for access to available credit. Still others may use wands, embedded tokens (e.g., in handheld computers, mobile telephones, watches, wearable computers, etc.), or other credit tokens that enable account access. The debt recovery account 130 includes an account balance 140, a credit limit 142, and an available credit balance 144. The opening account balance is equal to the charged-off debt 110 minus any settlement 120. The opening credit limit is set by the credit issuing business. The available credit balance 144 is equal to the credit limit 142 minus the account balance 140. If the account balance 140 is greater than the credit limit 142, then the available credit balance is $0.

In one embodiment of the credit account product 100, the opening credit limit is set such that it is less than the opening account balance. Establishing a credit limit 142 less than the account balance 140 means that when the debt recovery account 130 is opened it is not open-to-buy. While the debt recovery account 130 is not open-to-buy, the available credit balance 144 is $0 and the customer may not charge against the debt recovery account 130. This arrangement lowers the risk to the credit issuing business and requires that customer make one or more good faith payments to lower the account balance 140 until it is below the credit limit 142 to be able to charge against the account. The debt recovery account 130 includes an open-to-buy status 150 to track whether or not the open-to-buy conditions have been met. The open-to-buy conditions may simply be that the account balance 140 is reduced below the credit limit 142 and the available credit balance 144 is a positive amount. However, in alternate embodiments, the conditions may require that the account balance 140 be reduced below the credit limit 142 by a predetermined margin or that other payment history or assurance provisions are met before open-to-buy status is attained.

The credit issuing business administering the debt recovery account 130 may choose not to issue the credit card 132 for accessing the debt recovery account 130 until open-to-buy status is achieved. In order to track whether or not the credit card 132 has been issued, the debt recovery account 130 includes a card issued status 152. Not issuing the credit card 132 until open-to-buy status is achieved provides the customer with an incentive to pay down the account balance 140 and provides a tangible reward for reaching the open-to-buy milestone.

As with most conventional credit card accounts, the credit issuing business administering the debt recovery account 130 will issue bills to the customer to provide notice of account balance, credit limit, available credit, payment due (or confirmation of scheduled automatic payments), and similar information. The bills may be issued as conventional paper or through a variety of electronic channels, such as electronic mail, web publishing, or push technology to a mobile device, telephone, or other communication device. The credit issuing business may include an open-to-buy payment 160 in the billing information. The open-to-buy payment 160 is the amount required to reduce the account balance 140 to meet the open-to-buy conditions—for example, reducing the account balance 140 below the credit limit 142. The open-to-buy payment 160 provides a reminder of the importance of achieving open-to-buy status and plays a role in motivating the customer to make payments. The debt recovery account 130 may include a suggested payment 162, in addition to the open-to-buy payment 160. The suggested payment 162 provides a recommended payment to achieve open-to-buy status within a predetermined period, such as 12 months from the opening of the account. In one embodiment, the suggested payment is the open-to-buy payment divided by the number of billing cycles remaining in the predetermined period. This provides an incremental approach to reaching open-to-buy status and may be less daunting to the customer than the lump open-to-buy payment. Like conventional credit accounts, the debt recovery account 130 may include a minimum payment 164 based upon the outstanding balance and may be required to avoid penalties or loss of open-to-buy status. As with other credit accounts, automatic payment 166 may be established for the debt recovery account. This may be particularly advantageous in the context of debt recovery, as it avoids some of the causes of non-payment, such as forgetfulness, and gets the customer in the habit of regular payments.

The debt recovery account 130 may include a settlement contingency 170 related to all or part of the settlement 120. The settlement contingency 170 includes conditions that must be met for the account for the customer to comply with the terms of the settlement 120. Conditions may include making the minimum payments for a fixed period, achieving open-to-buy status within a fixed period (such as the predetermined period of the suggested payment), or similar conditions that show progress and commitment to paying off the reaffirmed portion of the debt.

As discussed above, the debt recovery account 130 is administered largely like conventional credit accounts and many existing systems and methods for administering such accounts are adaptable to this purpose. A variety of well-known features of credit accounts have been omitted from FIG. 1 in the interest of brevity, such as interest rate, fees, terms, transaction history, account information (account number, customer information, billing information, PIN, security interest, etc.), and similar credit account features. Such features are well-known and can be assembled in a variety of combinations. Discussion of the myriad possibilities is unnecessary to understanding the embodiments of the present invention.

FIG. 2 shows an example series of transactions 200 to demonstrate the operation of the credit account product 100 of FIG. 1. Within the example transactions 200, interest rates and fees have been omitted for simplicity of presentation. However, assessment of monthly interest charges and fees may impact the monthly account balance depending on the terms of the particular credit account. The transactions 200 start with a charged-off debt 210 of $1000 associated with a customer.

The customer enrolls 220 with the credit account product 100. Upon enrolling, the customer negotiates a 50% settlement 224 of her charged-off debt 210. $500 is written-off in the settlement 224. A debt recovery account 130 is created in the customers name and the remaining portion of the charged-off debt 210 is moved into debt recovery account 130. A $500 debt is transferred into the debt recovery account 130 to create an opening account balance of $500. The credit limit of the debt recovery account is $400, less than the opening account balance. The initial open-to-buy status is "no" due to the account balance exceeding the credit limit. In this example, the open-to-buy conditions include that the account balance must be reduced to $50 below the credit limit before the open-to-buy status will change. Thus, the open-to-buy payment is calculated to be $150. Note that no over-limit fee would be assessed, in spite of the fact that the current balance is over the credit limit.

The customer makes a $50 payment 230 to the debt recovery account 130. For example, the payment may have been made in response to a monthly billing cycle and suggested payment value. The entire $50 payment is applied against the $500 account balance, reducing it to $450. The credit limit has not changed and the open-to-buy conditions have not been met. The open-to-buy status does not change. The open-to-buy payment is recalculated based upon the new account balance to be $100. Once again, no over-limit fee would be assessed in spite of the current balance exceeding the credit limit.

The customer makes a $100 payment 240 to the debt recovery account 130. For example, the payment may have been made in response to a second monthly bill and the customer deciding to make the open-to-buy payment on the bill. The account balance is reduced to $350 and the open-to-buy conditions are met (the account balance is $50 less than the credit limit of $400). The open-to-buy status is changed to "yes". The open-to-buy payment is now the minimum payment required according to the terms of the credit account. As long as the minimum payment is met, the credit account remains open-to-buy. In an alternate example (not shown), the open-to-buy payment is no longer tracked or provided on the bill at all and does not reappear until open-to-buy status is lost, such as by overcharging the account. Because open-to-buy status has been achieved, a credit card is issued 242 to the customer to provide access to the debt recovery account. In addition, over-limit charges will apply to any future charges that carry the account balance over the credit limit.

The customer makes a $100 charge 250 to the debt recovery account 130. For example, the customer makes a purchase using the credit card she recently received. The account balance is increased to $450, which exceeds the current credit limit of $400. Open-to-buy status reverts to "no" to prevent further abuse of the account. A new open-to-buy payment is generated based upon the new account balance. In addition, any over-limit charges in the terms of the account would now apply 252.

Figure 3:
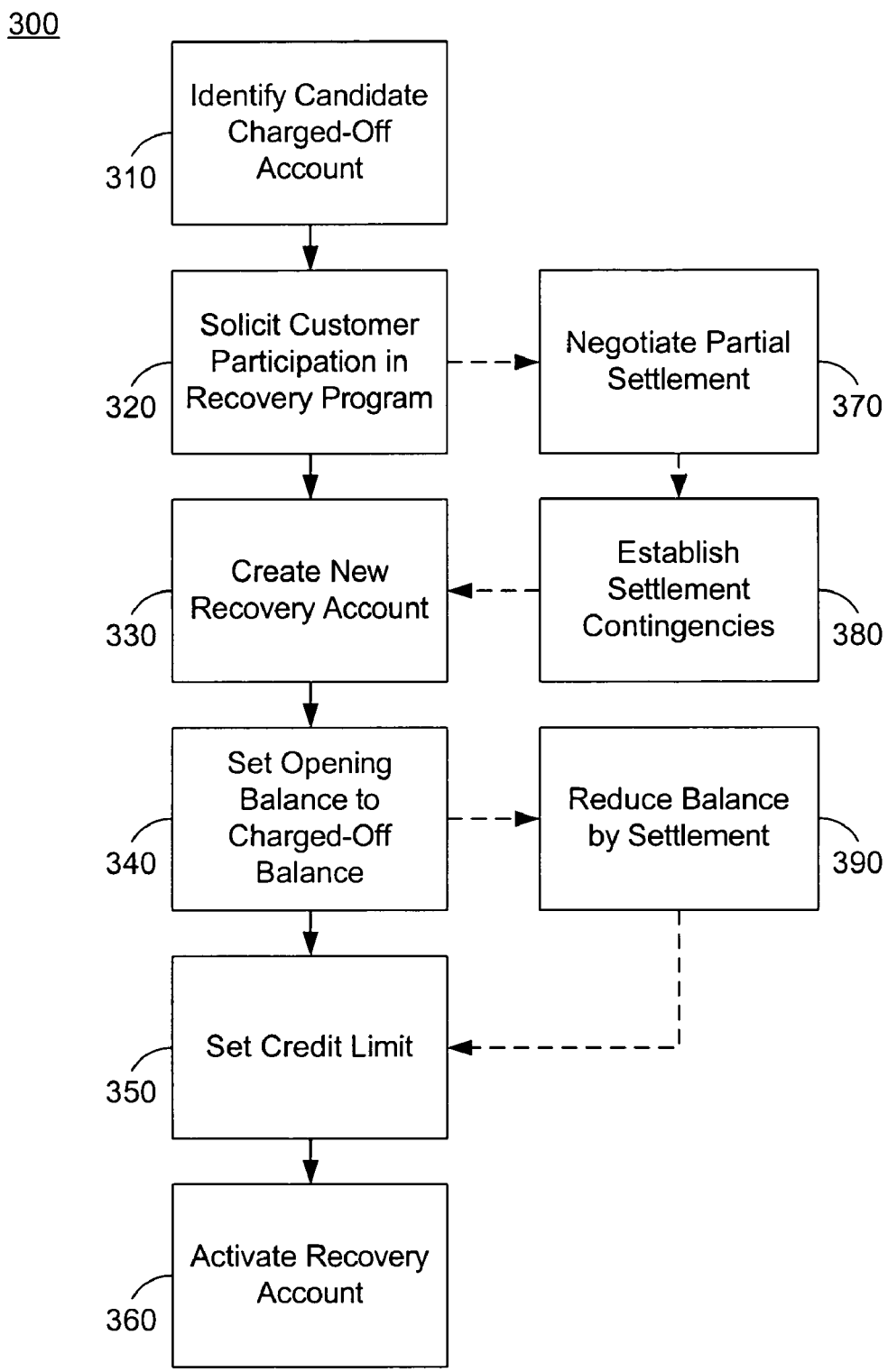
FIG. 3 is a flow diagram of an example method of enrolling customers in a credit account with debt recovery features.
Figure 4:
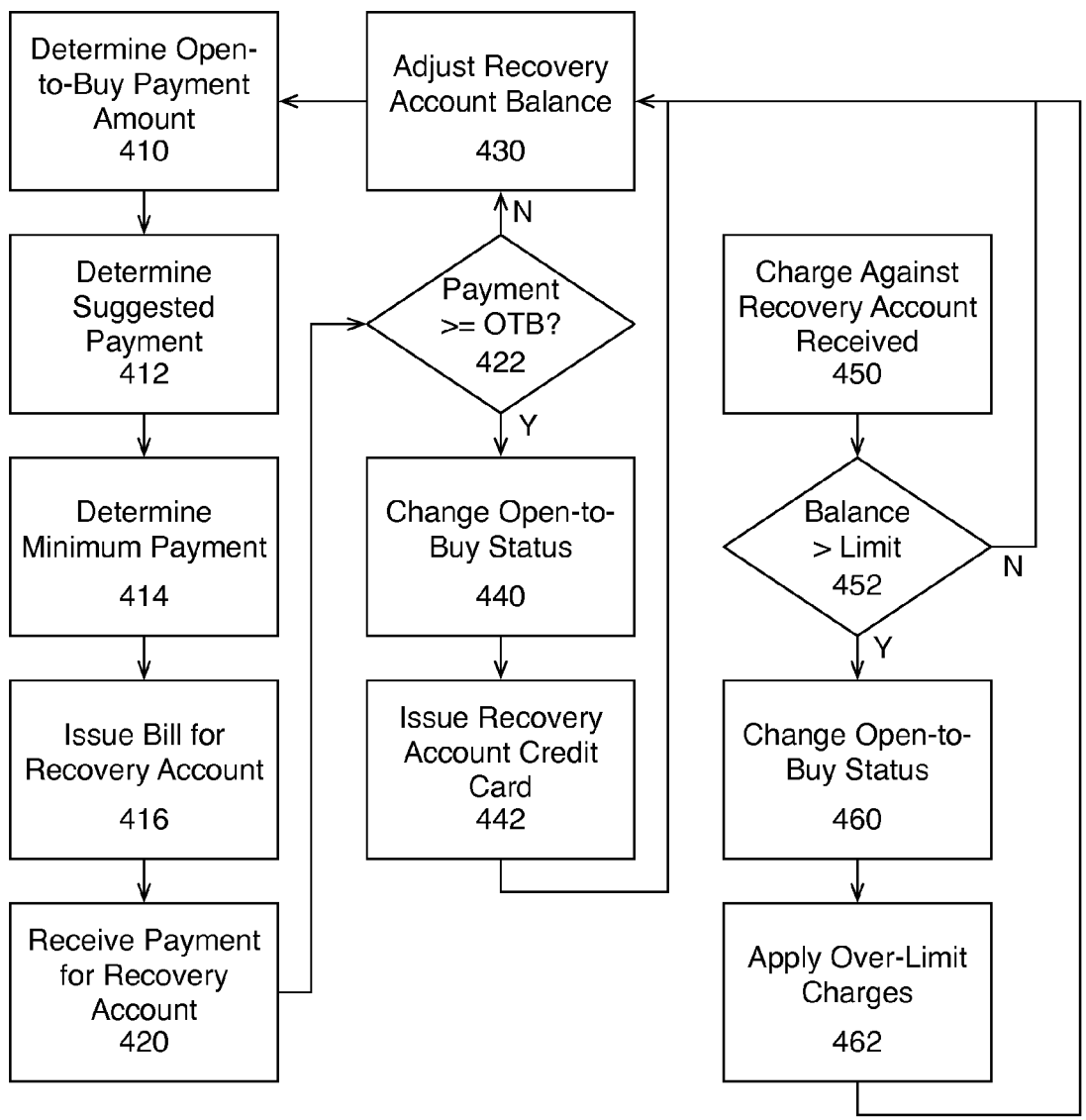
FIG. 4 is a flow diagram of an example method of managing a credit account with debt recovery features.

FIGS. 3 and 4 show methods for providing the debt recovery account 130. FIG. 3 shows a method 300 of enrolling customers in the debt recovery account 130 and FIG. 4 shows a method 400 of managing it. Candidate charged-off accounts are identified 310. For example, an administrator evaluates a plurality of charged-off accounts according to a predetermined set of criteria to determine which are likely candidates for reaffirmation and enrollment in the debt recovery account program. Customers associated with the selected charged-off accounts are solicited 320 for participation the debt recovery account program. For example, a program of direct mail and telephone solicitations is employed to contact the customers and present the debt recovery account program to them. For customers that decide to enroll in the program, a new recovery account is created 330. For example, the customer's personal information is associated with a new account number or the new account is associated with an existing customer profile and suite of accounts. The opening balance of the debt recovery account is set 340 to the customer's charged-off debt balance. For example, if the customer's charged-off debt balance was $1000, the opening balance of the debt recovery account would be $1000. The credit limit of the debt recovery account is set 350. For example, the credit limit of the debt recovery account may be determined by a formula based upon the opening balance, such as 50% of opening balance ($500). The debt recovery account is activated 360 to begin management activities. For example, the debt recovery account will enter regular billing cycles, enable receipt of payment, and allow the customer to establish automatic payments, make account balance inquiries, and otherwise manage their account. Note that activation of the account is distinct from achieving open-to-buy status, which is conditioned on the account balance being lower than the credit limit (or other open-to-buy conditions).

In one embodiment of the method 300, a portion of the charged-off debt is settled during the enrollment process. A partial settlement of the charged-off debt is negotiated 370 with the customer. For example, the customer may be offered a 50% settlement as an enticement to reaffirm the debt and enroll in the program. The terms of the settlement may include future conditions to be met by the customer with regard to some or all of the settlement value. Any settlement contingencies are established 380 for the account. If a settlement is negotiated, the opening balance of the debt recovery account is reduced 390 by the settlement amount.

The method 400 provides for managing the debt recovery account. Management of the debt recovery account typically occurs according to a regular billing cycle (e.g. monthly). It includes billing activities, payment receipt activities, and charge receipt activities. The management of the debt recovery account may also include account information management, customer service, non-payment activities, reporting activities, and other management activities. Systems and methods for these myriad processes are well known for credit account management and have been omitted from this description for clarity and brevity.

For each billing cycle, an open-to-buy payment amount is determined 410. For example, the open-to-buy payment amount is calculated based upon the difference between the current account balance and the credit limit, potentially with some margin condition for initiating open-to-buy status. A suggested payment is determined 412. For example, the suggested payment is based upon a recommended period from the opening of the account. The suggested payment is calculated by dividing the open-to-buy payment by the number of billing cycles remaining in the recommended period. A minimum payment is determined 414. For example, the minimum payment may be 3% of the current outstanding balance. A bill is issued 416 to the customer for the debt recovery account. For example, a paper or electronic bill including the current balance, credit limit, available credit (if any), open-to-buy payment, suggested payment, and minimum payment is sent to the customer.

In response to the bill or billing cycle, a payment is received 420 for the debt recovery account. For example, a check or automated payment is received from the customer to reduce the account balance. The payment is evaluated 422 to determine whether it is more than or equal to the open-to-buy payment. If the payment is less than the open-to-buy payment, the debt recovery account balance is adjusted 430 to reflect the received payment and management of the account continues into the next billing cycle. Note that, even if the account balance is still over the credit limit, no over-limit charges will apply until open-to-buy status is achieved for the account at least once. However, if the payment is more than or equal to the open-to-buy payment, several actions occur. The open-to-buy status is changed 440 such that the credit account may now be used for purchases. In addition, a debt recovery account credit card (or other credit access token) is issued 442 to the customer to facilitate access to the credit. Once the open-to-buy status had been changed 440 and the credit card issued 442, the debt recovery account balance is adjusted 430 and management of the account continues into the next billing cycle.

Once the debt recovery account is open to buy, new charges against the account will be received 450. For example, the customer may use his newly received credit card to make a purchase through the appropriate credit card network and associated vendor. The charge is evaluated 452 to determine whether or not the new balance of the debt recovery account will be greater than the credit limit. If not, the balance is adjusted 430 based upon the charge and management of the account continues into the next billing cycle (or receipt of additional charges). If so, the open-to-buy status is changed 460 to prevent additional charges against the account. Over-the-limit charges are now applied 462, because the account balance had been below the credit limit and open-to-buy status had previously been achieved. Management of the account continues into the next billing cycle and may involve additional consequences coming from exceeding the account credit limit, depending on the terms of the account.

Figure 5:
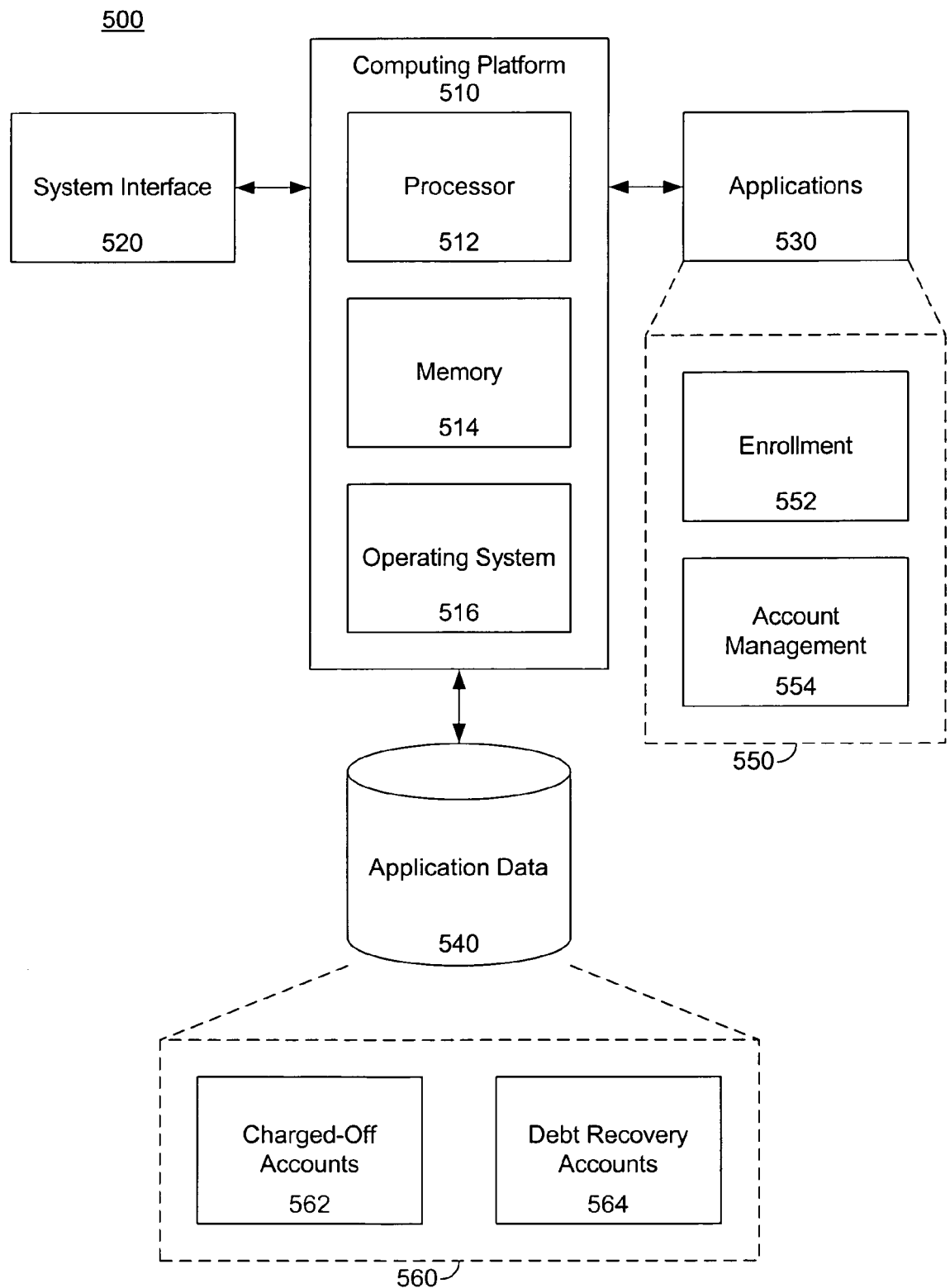
FIG. 5 is a block diagram of an example system for providing a credit account with debt recovery features.

FIG. 5 shows a computer system 500 for administering debt recovery accounts. The computer system 500 includes a computing platform 510, a system interface module 520, an applications module 530, and an application data source 540. The computer system 500 supports one or more users for executing administrative processes related to the debt recovery accounts. The systems and methods described above with regard to FIGS. 1-4 may be implemented in whole or in part with a variety of computer systems. Computer systems for administering credit accounts are well-known and modification to implement the features described above is a matter of routine operation dependent on the particular platform, need for system integration, and the preferences of the implementer.

The computing platform 510 includes a processor 512, memory 514, and an operating system 516. The computing platform 510 instantiates and executes program instructions to provide data management, calculation, and communication functions. Common computing platforms for financial applications include personal computers (desktops, laptops, tablets, etc.), servers, clusters, and mainframes. Other computing platforms include personal digital assistants, cellular telephones, game systems, media systems, embedded systems, wearable computers, and special purpose computers (cash registers, ATMs, routers, medical systems, etc.). The computing platform 510 executes the instructions of one or more applications from the applications module 530 to operate on data from the application data source 540. Input, output, and other communications are provided through the system interface module 520.

The system interface module 520 provides means for interacting with the resources of the computing platform 510 and the applications and data processed thereby. The system interface module 520 includes input, output, communication, and combination devices and subsystems. Common system interface components include displays, keyboards, mice, speakers, network devices (modems, network cards, transceivers, etc.), and media drives (disc, CD-ROM, DVD-ROM, tape, card, flash memory, etc.). The network devices may integrate the computer system 500 into a larger network, such as a telephony-based network, proprietary network, local area network, intranet, wide area network, or the Internet. Networking may allow the resources of the computer system 500 to be distributed among a variety of geographically dispersed components, including multiple or distributed computing platforms. Other system interface components include printers, scanners, cameras, detectors, card readers, prototypers, game controllers, touch screens, and many others. Implementation of the system interface module 520 will depend upon the nature of the computer platform 510 and the circumstances and preferences of the user.

The applications module 530 includes any number of application programs supporting administration of debt recovery accounts. The applications module 530 includes credit account management applications 550. The credit account management applications 550 include a variety of administrative applications (some not shown), such as an enrollment module 552 and an account management module 554. The enrollment module 552 includes one or more applications to assist in the identification of candidate charged-off accounts, management of the solicitation of and negotiation with candidate customers, and establishment of new debt recovery accounts. In one embodiment, the enrollment module 552 implements computer assistance for the method 300 in FIG. 3. The account management module 554 includes one or more applications to assist in the management of active debt recovery accounts, including billing, payment handling, charge handling, and implementation of account terms (status, fees, interest, minimum payments, conditions, etc.). In one embodiment, the account management module 552 implements computer assistance for the method of claim 400 in FIG. 4.

The application data source 540 includes any number of data sources supporting administration of the data recovery accounts and the related applications in the applications module 530. The application data source 540 may include a variety of hardware storage devices, such as hard drives, removable media (disc, CD-ROM, DVD-ROM, tape, card, flash memory, etc.), or storage servers or networks. The application data source 540 may also include software systems, such as file systems, relational database management systems, or a variety of other data management platforms. The application data source 540 includes credit account management data 560, including charged-off account data 562 and debt recovery account data 564. The charged-off account data 562 includes records of customers with charged-off account balances. The debt recovery account data 564 includes records for customers with active debt recovery accounts. The records in the debt recovery account data 564 may include, among other data, account balance, credit limit, available credit, open-to-buy status, card issued status, over-limit status, and periodic bill information (suggested payment, open-to-buy payment, minimum payment, automatic payment, etc.).

As an example, a particular configuration of a system for implementing the present invention is provided. In various embodiments, the system may be implemented on a single personal computer or a system of networked machines and can be based on ORACLE/SQL and SAS. The general process involves creating a file by extracting information from the ORACLE database the running on the server by issuing various SQL commands. We then process the file using SAS on a UNIX box. The final file is shipped to a solicitation group that can run programs off the network. The account monitoring, which is the basis of determining when a credit card should be issued, is performed on the UNIX box with SAS. The collection of these accounts and the triggering of some of the movement from "qualified for the program" to "not qualified" is done on a network of machines using a program called B-frame.

What is claimed is:

1. A method of recovering debt from a customer with a charged-off credit account balance, the method comprising:
   electronically creating and storing in a computing platform a single recovery credit account for the customer with the charged-off credit account balance, the single recovery credit account not having a debt balance record;
   electronically setting an opening credit balance of the recovery credit account in the computing platform to a value equal to at least a portion of the charged-off credit account balance and wherein the opening credit balance represents the entire debt obligation of the customer related to the charged-off credit balance;
   before issuing a card for the single recovery credit account, requiring from the customer a plurality of payments;
   receiving the plurality of payments from the customer;
   electronically adjusting the opening credit balance based on the received payments; and
   in response to receiving the payments, issuing the card to the customer.

2. The method of claim 1, further comprising setting a credit limit for the recovery credit account that is less than the opening credit balance of the recovery credit account and wherein the recovery credit account is not open-to-buy until the recovery credit account balance is less than the credit limit.

3. The method of claim 2, further comprising issuing a credit token corresponding to the recovery credit account only after the recovery credit account balance is less than the credit limit, the credit token enabling access to an available balance of the recovery credit account.

4. The method of claim 2, further comprising issuing a bill to the customer for the recovery credit account wherein the bill includes a payment amount that reduces the recovery account balance to less than the credit limit.

5. The method of claim 2, further comprising charging an over limit fee when the recovery account balance is over the credit limit only after the recovery credit account balance has been less than the credit limit.

6. The method of claim 1, further comprising issuing a bill to the customer for the recovery credit account wherein the bill includes a suggested payment.

7. The method of claim 1, further comprising establishing an automatic payment service for payments to the recovery credit account from the customer.

8. The method of claim 1, wherein the difference between the charged-off credit account balance and the opening balance of the recovery credit account is a settlement value negotiated with the customer.

9. A computer comprising a memory for storing program instructions and a processor, responsive to the programming instructions, configured to: create a single recovery credit account for a customer with a charged-off credit account balance, the single recovery credit account not having a debt balance record; set an opening credit balance of the recovery credit account to a value equal to at least a portion of the charged-off credit account balance and wherein the opening credit balance represents the entire debt obligation of the customer related to the charged-off credit balance; receive a plurality of required payments; adjust the opening credit balance based on the received payments; and in response to receiving the payments, initiating an issuance of a card to the customer.

10. The computer of claim 9, further configured to set a credit limit for the recovery credit account that is less than the opening credit balance of the recovery credit account and wherein the recovery credit account is not open-to-buy until the recovery credit account balance is less than the credit limit.

11. The computer of claim 10, further configured to issue a credit token corresponding to the recovery credit account only after the recovery credit account balance is less than the credit limit, the credit token enabling access to an available balance of the recovery credit account.

12. The computer of claim 10, further configured to issue a bill to the customer for the recovery credit account wherein the bill includes a payment amount that reduces the recovery account balance to less than the credit limit.

13. The computer of claim 10, further configured to charge an over limit fee when the recovery account balance is over the credit limit only after the recovery credit account balance has been less than the credit limit.

14. The computer of claim 9, further configured to issue a bill to the customer for the recovery credit account wherein the bill includes a suggested payment.

15. The computer of claim 9, further configured to establish an automatic payment service for payments to the recovery credit account from the customer.

16. The computer of claim 9, wherein the difference between the charged-off credit account balance and the opening balance of the recovery credit account is a settlement value negotiated with the customer.

17. A system comprising:
   means for creating a single recovery credit account for a customer with a charged-off credit account balance, wherein the single recovery credit account does not have a debt balance record;
   means for setting an opening credit balance of the recovery credit account to a value equal to at least a portion of the charged-off credit account balance and wherein the opening credit balance represents the entire debt obligation of the customer related to the charged-off credit balance;
   means for receiving a plurality of required payments from the customer; and
   means for initiating an issuance of a card to the customer when the required payments are received.

18. The system of claim 17, further comprising means for setting a credit limit for the recovery credit account that is less than the opening credit balance of the recovery credit account and wherein the recovery credit account is not open-to-buy until the recovery credit account balance is less than the credit limit.

19. The system of claim 18, further comprising means for issuing a credit token corresponding to the recovery credit account only after the recovery credit account balance is less than the credit limit, the credit token enabling access to an available balance of the recovery credit account.

20. The system of claim 18, further comprising means for issuing a bill to the customer for the recovery credit account wherein the bill includes a payment amount that reduces the recovery account balance to less than the credit limit.

21. The system of claim 18, further comprising means for charging an over limit fee when the recovery account balance is over the credit limit only after the recovery credit account balance has been less than the credit limit.

22. The system of claim 17, further comprising means for issuing a bill to the customer for the recovery credit account wherein the bill includes a suggested payment.

23. The system of claim 17, further comprising means for establishing an automatic payment service for payments to the recovery credit account from the customer.

24. The system of claim 17, wherein the difference between the charged-off credit account balance and the opening balance of the recovery credit account is a settlement value negotiated with the customer.

* * * * *